Feb. 11, 1936.  R. A. MILLER  2,030,167

RIVET

Filed Aug. 28, 1931

INVENTOR
Ralph A. Miller.
BY
Harness, Dickey, Pierce & Hann,
ATTORNEYS.

Patented Feb. 11, 1936

2,030,167

UNITED STATES PATENT OFFICE 2,030,167

RIVET

Ralph A. Miller, Detroit, Mich., assignor, by mesne assignments, to Huxon Holding Corporation, Detroit, Mich., a corporation of Michigan Application August 28, 1931, Serial No. 559,826

17 Claims. (Cl. 85—37)

The invention relates to devices for securing structural elements together and it has particular relation to rivets for connecting a plurality of metal plates or the like.

In certain respects, the invention constitutes an improvement over that embodied in the copending application for patent of Louis C. Huck relating to rivets, filed June 17, 1931, the serial number of which is 545,004.

According to the copending application for patent, a tubular female rivet member is provided, which comprises a cylindrical body substantially uniform in diameter throughout its length, having an enlarged rivet head at one end thereof. An elongated shank or male member, preferably adapted to have a press fit in the opening in the female member and having a head at one end substantially equal in diameter to the outer diameter of the body is inserted in the opening in the female member from that end opposite the rivet head, until the head on the shank engages this end of the female member. The assembly then is inserted through aligned openings in a plurality of plates to be connected by the rivet, until the head on the rivet engages the outer side of the plate adjacent thereto. Then the rivet head is maintained against the plate, while the end of the shank, projecting outwardly beyond the rivet head, is pulled through the latter by suitable apparatus provided for this purpose, the reactionary forces of the apparatus maintaining the head against the plate. This operation causes the head on the shank to buckle the walls of the body between such head and the adjacent plate, and against the latter around the opening therein. The rivet then cannot be removed because the rivet head prevents its movement through the openings in the plate in one direction, while the buckled body prevents movement of the rivet in the other direction.

The present invention relates particularly to various forms of female members which may be utilized in rivets of the above mentioned general character, and also to improvements in shanks for buckling the body of the female member.

The principal objects of the invention are to provide a rivet of the above mentioned character, in which the body portion of the female member is so constructed that it will buckle in a more satisfactory manner when a pulling force is imparted to the shank projecting therethrough; to provide a rivet in which that portion of the body of the female member adapted to be buckled, has less resistance to such deformation than other portions of the body; to provide a rivet in which the body of the female member is so constructed that buckling thereof will initially occur in a predetermined region; to provide a rivet in which the body of the female member, longitudinally of its length, has a varying resistance to buckling, thereby governing deformation thereof in a predetermined and progressive manner; to provide a rivet in which the head on the male member and the end of the body it engages, are so constructed that buckling of the body will be facilitated, and to provide a rivet of the above mentioned character which is so constructed that the head on the shank or male member will be prevented from shearing off during the setting of the rivet.

For a better understanding of the invention reference may be had to the accompanying drawing forming a part of the specification, wherein:

Figure 13 illustrates a rivet, in which the body of the female member is provided with a small bevel at its end opposite the rivet head, and the head on the male member is undercut to cooperate with the bevel on the female member;

Figure 1:
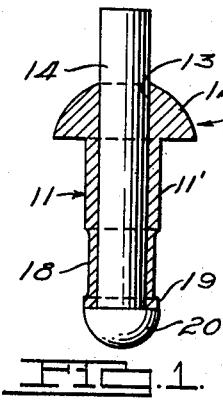
Figure 1 illustrates a rivet constructed according to one form of the invention, in which the body of the female member adapted to be buckled during the riveting operation, has a portion of uniform, reduced diameter.

In the construction shown by Fig. 1, the female member is indicated at 10, and comprises a cylindrical body 11, having a rivet head 12 at one end. Both of these parts of the female member are provided with a longitudinally extending opening 13 of uniform diameter, which receives a male member 14, the diameter of which is substantially equal to that of the opening. A part of the body 11 indicated at 11', which is adjacent the rivet head 12, is of such diameter that it can be inserted in an opening 15 shown by Fig. 2, formed in plates 16 and 17 to be riveted. The opposite end portion of the body 11 indicated at 18, is of reduced, uniform diameter, except for an end portion 19 at the extreme outer end which is substantially equal in diameter to that of the portion 11'. The male member is provided with a rounded head 20 engaging this end of the body and such head is of such diameter that it will pass through the opening 15 in the plates. When the parts are assembled as shown by Fig. 1, an end of the male member projects beyond the outer side of the rivet head 12, and the member has a press fit in the opening 13.

Figure 2:
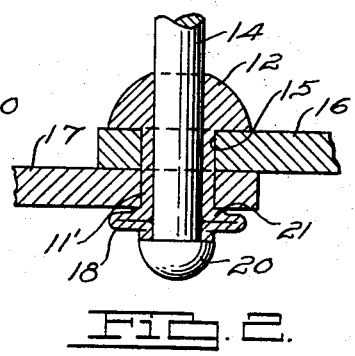
Figure 2 illustrates the manner in which the rivet shown by Figure 1 is utilized for connecting a pair of plates.

In applying the rivet to the plates 16 and 17, the assembly shown by Fig. 1 is inserted through the opening 15 in the plates, from the rivet head or outer side of plate 16 as shown by Fig. 2, until the rivet head abuts the outer surface of the latter plate. Then by means of suitable apparatus, the head is maintained against the plate 16, and the male member 14 is pulled through the female member toward the outer side of this plate. Initially during this movement of the male member, it may decrease slightly in diameter which will permit its movement through the female member without difficulty, and then the head 20 on the male member will cause the portion 18 of the body to expand and buckle. During the final stages of the riveting operation, the end of portion 11' of the female member projecting beyond the outer surface of plate 17, also will be bent outwardly against the plate 17, as indicated at 21. When the rivet is finally applied, the parts on the outer surface of plate 17 assume relative positions as shown by Fig. 2. When tension on the male member is released, it again increases in diameter until it has a press fit in the opening 15 in the female member, thereby positively sealing the opening against water and the like. Finally, that end of the male member projecting beyond the rivet head 12 is severed to provide a smooth rivet head surface.

As shown, the portion 11' of the female member is longer than the thickness of both plates, and as stated above, the end of the portion will finally buckle as indicated at 21. Initially, the portion 18, which is thinner than portion 11', will buckle first and then upon final movement of the male member, the end portion 11' will buckle. When the portion 18 buckles, it is clear that it will then constitute a rather large, effective head for the head 20 on the male member to work against, which will facilitate buckling of the protruding end of portion 11'. The relatively thick portion 19 on the female member will of course reinforce it during buckling and insure proper buckling of the portion 18.

If desired, the thicker portion 11' may be equal in length to or shorter than the thickness of the plates, in which event the thinner portion 18 will buckle directly against them.

The head 20 on the male member preferably is undercut as illustrated in the previously mentioned application for patent, although it may be made without undercutting if this is desired.

Figure 3:
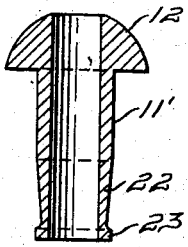
Figures 3 and 4 illustrate a different form of female member and the manner in which it buckles, wherein the buckling portion gradually tapers or is reduced in outside diameter toward the end of the body opposite the rivet head.
Figure 4:
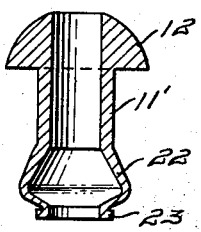

In the construction shown by Figures 3 and 4, illustrating only the female part of the rivet, the end portion of the body adapted to be buckled, has an outer surface 22 which gradually decreases in outside diameter toward the end of the body opposite the rivet head 12. In this construction similarly to that shown by Fig. 1, the extreme end of the body corresponds in dimensions to the part 11' of the body, as indicated at 23, this portion engaging the head 20 on the male member during the riveting operation. The manner in which the gradually tapering portion 22 buckles during the riveting operation is shown by Fig. 4, it being understood that the body as shown, is only partially buckled.

Figure 5:
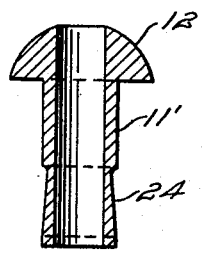
Figures 5 and 6 illustrate a female member and the manner in which it buckles, wherein the buckling part of the body is gradually reduced in diameter toward the rivet head.
Figure 6:
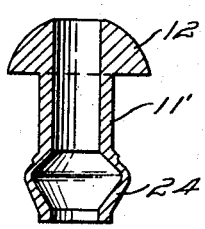

In Fig. 5, the body is provided with a portion 24, the outer surface of which gradually decreases in outside diameter from the outer end of the body, toward the rivet head 12. When a rivet of this character is applied, the tapering portion 24 initially buckles in substantially the manner shown by Fig. 6.

Figure 7:
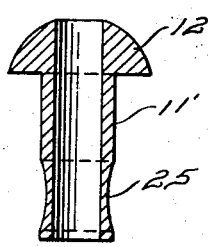
Figures 7 and 8 illustrate a female member and the manner in which it buckles, wherein the buckling part of the member has an outer surface concaved in an axial direction.
Figure 8:
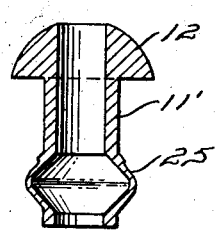
Figure 9:
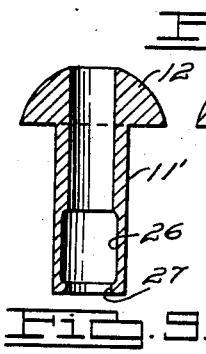
Figure 9 illustrates a female member similar to that shown by Fig. 1, but wherein the inner surface of the buckling part of the body has a larger diameter than the remaining part of the opening in the body.
Figure 10:
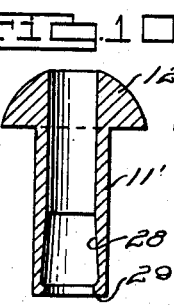
Figure 10 illustrates a female member similar to that shown by Fig. 3, but wherein the inner peripheral surface of the buckling portion of the body increases in diameter toward the end of the latter opposite the rivet head.

According to Fig. 7, the outer end of the body has a concaved peripheral surface indicated at 25 and when this part of the body is buckled, it deforms in the manner shown by Fig. 8. According to Fig. 9, the outer end of the body has its inner surface enlarged in diameter as indicated at 26 and this surface of increased diameter extends to a point near the end of the body. The extreme end portion of the body has its inner peripheral surface indicated at 27 substantially equal in diameter to the diameter of the inner surface of the body part 11' adjacent the rivet head. According to Fig. 10, the outer end of the body has an inner peripheral surface which gradually increases in diameter away from the rivet head, as indicated at 28 and the extreme outer end of the body corresponds in dimensions to those of the body adjacent the rivet head as indicated at 29.

Figure 11:
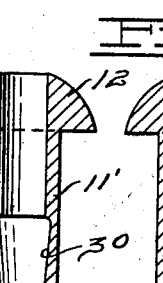
Figure 11 illustrates a female member similar to that shown by Fig. 5, but wherein the inner peripheral surface of the buckling part of the body gradually increases in diameter toward the rivet head.
Figure 12:
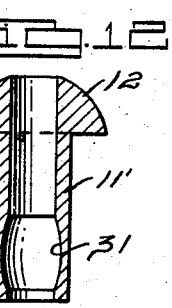
Figure 12 illustrates a female member in which the buckling portion of the body has its inner peripheral surface concaved longitudinally.

According to Fig. 11, the outer end of the body has its inner surface indicated at 30, gradually increasing in diameter toward the rivet head 12 to an intermediate point in the body. This construction is similar to that shown by Fig. 5, except that the inner surface of this part of the body increases in diameter while in Fig. 5, this part of the body has its outer surface decreasing in diameter toward the rivet head. According to Fig. 12, the outer end of the body has its inner peripheral surface concave in character as indicated at 31. This construction is similar to that shown by Fig. 7 except that the inner surface is concave, while in Fig. 7 the outer surface is concave.

Figures 14, 15:
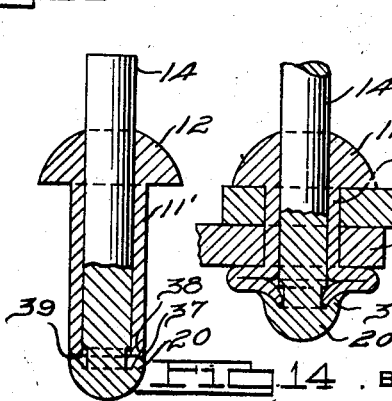
Figure 14 illustrates the manner in which the rivet shown by Fig. 13 is applied to a pair of plates.
Figure 15 is a fragmentary and enlarged cross-sectional view, illustrating the relation between the head of the male member and the end of the female member shown by Figure 13.

In the constructions shown by Figs. 13, 14, and 15, the shank 14 has an annular groove 39' adjacent the head 20, and the head is provided with an undercut annular flange 37 extending over the groove, the outer portion of which engages a short beveled edge 38 on the end of the body 11. It will be noted that an annular recess, as indicated at 39, is provided by the flange 37, the end of the body inwardly of the bevel 38, and the groove 39'. When the rivet is applied in the manner shown by Fig. 16 the bevelled portion 38 of the body will move along the inclined surface of undercut portion 37 on the shank head 20, and move into the recess 39 and groove 39'. This locks the male member to the end of the body and facilitates buckling the latter. During such buckling operation, the undercut portion 37 is deflected outwardly as shown by Fig. 14, and prevents the head from shearing and passing through the female member.

In the constructions shown by Figs. 3 to 12 inclusive, it is to be understood, as stated with respect to Figs. 1 and 2, that the body portion 11' may be equal in length to or longer than the thickness of the plates, if this should be found desirable. In all of the constructions, the larger portion at the outer end of the female member, as for example, that indicated at 19 in Fig. 1, is preferred because it gives the male member head a greater and stronger region to work against, and prevents movement of the male member through the rivet.

Rivets such as those described and illustrated are extremely efficient for maintaining structural elements connected, and permitting application of the rivets from one side of the structure. Constructing the female members in such manner that buckling thereof against the inner side of the structure riveted is facilitated, enables applying the rivet more quickly, and more satisfactorily insures proper buckling of the female member against the inner side of the structure. In view of the fact, that the inner side of the structure riveted usually will not be visible, and hence the manner in which the female member is buckled not visible, it is important that the rivet be so constructed that uniform buckling of the female member will be obtained.

As stated in the pending application for patent, preferably the female member is constructed of metal relatively ductile as compared to the metal in the male member and as a particular example of the metals which may be used, the female member may be constructed of aluminum, while the male member may be constructed of duralumin.

It is also desirable to construct the female member of metal less subject to corrosive and electrolytic action at slight sacrifice in strength. The male member being better protected, may be constructed of metal more corrosive than the female member. This is desirable because the female member has a greater exposed surface which may be subjected to elements tending to produce corrosion. By constructing the male member of a more corrosive but stronger metal such as duralumin and the female member of a less corrosive but somewhat weaker metal, such as aluminum, a desirable metal combination is obtained as the male member will considerably increase the strength of the rivet while the female member will prevent undesirable corrosion.

As another combination of metals which may be used, the female member may be constructed of 1010 steel, and the male member of 1045 steel, S. A. E. specifications. The latter member then may be heat treated for greater strength. It is to be understood that the diameter of the shank of the male member and the wall thickness of the body portion of the female member are so proportioned that the female member will buckle before the male member receives any permanent deformation. Then when the pull on the male member is released, it returns substantially to its original diameter and the male member has a final press fit in the opening in the female member. While the proportional dimensions of the shank and body portion 10 of the female member may be predetermined to insure desired deforming of the female member before that of the shank, the latter result may be obtained or modified by using metals having different strengths.

Although certain forms of the invention have been described and illustrated in detail, it should be apparent to those skilled in the art that various modifications may be made without departing from the scope of the appended claims.

I claim:

1. A rivet comprising a tubular body having a continuously annular wall, said wall having a portion intermediate its ends progressively varying in thickness, and portions at opposite sides of the first portion which are substantially of equal thickness.

2. In combination, a rivet member having a tubular body portion having a continuously annular wall adapted to project through openings in a structure to be riveted, a tubular portion having a continuously annular wall of less radial wall thickness adapted to project at one side of the structure and which therminates in a portion having increased resistance to radial expansion, and means engaging the last portion for applying axially compressive forces toward the structure, to outwardly bulb the tubular portion of lesser wall thickness.

3. In combination, a rivet member having a body portion adapted to project through openings in a structure to be riveted, a tubular portion having a continuously annular wall adapted to project beyond one side of the structure, means integral with the free end of the latter portion increasing the resistance of such end to radial expansion, and means engaging such end of the tubular portion for applying axial forces toward the structure, to outwardly bulb the tubular portion between the reinforced end and the structure.

4. In combination, a rivet member having a body portion adapted to project through openings in a structure to be riveted, a tubular portion having a continuously annular wall adapted to project from one side of the structure, a member engaging the outer end of the latter portion for applying axial forces thereto to bulb the tubular portion into an annular head, and means forming a part of the tubular portion for predetermining the point where bulbing of the wall is initiated.

5. In combination, a rivet member having a body portion adapted to project through openings in a structure to be riveted, a tubular portion having a continuously annular wall adapted to project from one side of the structure, a member engaging the outer end of the latter portion for applying axial forces thereto to bulb the tubular portion into an annular head, and means forming a part of the tubular portion for predetermining the point where bulbing of the wall is initiated, said last mentioned means comprising a weaker portion of the tubular wall located intermediate its ends.

6. In combination, a rivet member having a body portion adapted to project through openings in a structure to be riveted, a tubular portion having a continuously annular wall adapted to project from one side of the structure, a member engaging the outer end of the latter portion for applying axial forces thereto to bulb the tubular portion into an annular head, and means comprising parts of the tubular portion varying in resistance to bulbing, for governing the character of the bulbing action.

7. In combination, a tubular rivet member adapted to be inserted and set from one side of a structure and having a body portion adapted to project through openings in the structure, a tubular portion having a continuously annular wall adapted to project from that side of the structure opposite the insertion side, a member extending through and engaging the outer end of the latter portion of the tubular member for applying axial forces thereto to bulb the tubular portion when the last mentioned member is pulled from the insertion side and the end of the tubular member at the same side of the structure is held by the reactionary force of the pull, and an annular end sector at the free end of the tubular portion having increased resistance to bursting.

8. In combination, a structure having openings, a rivet comprising a tubular member extending through the structure and beyond one side thereof, means for bulbing such projecting portion including means for effecting location of the line of greatest diameter of bulbing, nearer to the structure than to the end of the bulbed portion remote with respect to the structure.

9. A rivet comprising a tubular body having a head at one end and a continuously annular wall adapted to be bulbed into an annular head by axial forces applied to opposite ends of the body, and a shank in the body having a head engaging the end of the body opposite the head thereon, a wall portion of the body intermediate the ends of the latter being relatively thin.

10. A rivet comprising a tubular body having a continuously annular wall adapted to be bulbed into an annular head defined by folded wall portions, said wall having a portion intermediate its ends progressively varying in thickness and portions at opposite sides of the first portion which are of greater thickness than the intermediate portion.

11. In combination, a rivet member having a tubular body portion adapted to project through openings in a structure to be riveted, a tubular portion defined by a continuously annular wall adapted to project at one side of the structure and to be bulbed into an annular head, the thickness of said portion to be bulbed being generally less than the thickness of the portion adapted to project through the structural openings, and means engaging the portion to be bulbed for applying axially compressive forces toward the structure so as to bulb such portion into an annular head.

12. A rivet comprising a tubular member and a pin extending partially therethrough, said tubular member having a groove on its inner periphery, the rivet being adapted to be set by moving the pin through the tubular member so as to form a head on one end of the tubular member.

13. A rivet comprising a tubular body having a portion adapted to be disposed in openings in a structure to be riveted and a continuously annular portion at one end generally of larger internal diameter adapted to project beyond one side of the structure, a pin projecting through the tubular member and beyond the other end of the tubular member, and means on the pin for applying axial forces against the outer end of said second portion when the opposite end of the pin is pulled and the same or adjacent end of the tubular member is held substantially against movement with the pin, so as to cause said second tubular portion to bulb into an annular folded wall head.

14. A rivet comprising a tubular body having a portion adapted to be disposed in openings in a structure to be riveted, a continuously annular portion at one end adapted to project beyond one side of the structure and to be expanded into an annular head by axial forces, and a head adapted to engage the opposite side of the structure, a pin passing through the structure and projecting beyond said last mentioned head, means on the pin at its opposite end for applying axial forces to the outer end of said projecting tubular portion, and means on the outer end of the latter increasing its resistance to outward expansion so as to promote initial expansion inwardly of the outer end of said portion.

15. A rivet comprising a tubular body having a portion adapted to be disposed in openings in a structure to be riveted and a continuously annular portion at one end adapted to project beyond one side of the structure to be riveted and to be expanded into an annular head by axial forces, a pin passing through the structure and beyond the opposite end of the tubular body, means on the pin for applying axial forces to the outer end of the second tubular portion of the body when the opposite end is pulled and the adjacent end of the body is substantially held against movement with the pin, and means inherent in the outer end of the second tubular portion increasing its resistance to outward expansion so as to promote initial expansion of said portion inwardly of said outer end thereof.

16. An article of manufacture comprising a tubular rivet member adapted to project through openings in a structure to be riveted and having a portion adapted to project beyond one side of the structure and to be bulbed into an annular head by applying opposed axial forces to the ends thereof, the wall of said portion of the member being continuously annular, means comprising an annular integral end portion of increased wall thickness for increasing the bursting strength and substantially preventing expansion of the free end of said projecting portion of the member when the bulbed head is to be formed, a pin extending through the member, and means on the pin for applying axial forces to such end of the member when the pin is pulled relative to the latter.

17. An article of manufacture comprising a rivet member adapted to project through openings in a structure to be riveted and having a portion adapted to project beyond one side of the structure and to be bulbed into an annular head by applying opposed axial forces to the ends thereof, said portion being tubular and the wall thereof being continuously annular, and means inherent in the free end of the projecting portion increasing its bursting strength and substantially preventing expansion of said end when said portion is to be bulbed, said means comprising an annular end section of substantially the same outer diameter as that of the portion to be bulbed but of smaller inner diameter than that of the portion adjacent said end.

RALPH A. MILLER.